United States Patent [19]

Bui et al.

[11] Patent Number: 4,626,760
[45] Date of Patent: Dec. 2, 1986

[54] CONTROL CIRCUIT FOR A STEPPING MOTOR

[75] Inventors: Ngoc C. Bui, Fontaines; Henry Gête, Les Hauts-Geneveys; Jean-Claude Robert-Grandpierre, Neuchâtel, all of Switzerland

[73] Assignee: Asulab SA, Neuchatel, Switzerland

[21] Appl. No.: 711,846

[22] Filed: Mar. 14, 1985

[30] Foreign Application Priority Data

Mar. 23, 1984 [CH] Switzerland ................................ 1482

[51] Int. Cl.[4] ............................................... H02P 8/00
[52] U.S. Cl. .................................... 318/696; 318/685; 368/157
[58] Field of Search ............... 318/696, 685, 138, 459, 318/317; 323/315, 316; 368/157

[56] References Cited

U.S. PATENT DOCUMENTS

| 3,560,821 | 2/1971 | Beling | 318/138 |
| 4,227,127 | 10/1980 | Fukaya et al. | 318/317 |
| 4,453,194 | 6/1984 | Frankeny et al. | 361/154 |
| 4,544,878 | 10/1985 | Beale et al. | 323/315 |

Primary Examiner—William M. Shoop, Jr.
Assistant Examiner—Saul M. Bergmann
Attorney, Agent, or Firm—Peter L. Berger

[57] ABSTRACT

The control circuit comprises means for measuring current flow in the motor winding including an auxiliary transistor and means to form periodically a current mirror from such auxiliary transistor and one of the transistors coupled to the winding for applying thereto energization pulses, i.e. motor drive pulses, catch-up pulses or check pulses.

4 Claims, 3 Drawing Figures

CONTROL CIRCUIT FOR A STEPPING MOTOR

This invention has as its object the providing of a control circuit for a stepping motor having a rotor and a winding magnetically coupled to said rotor, comprising means which include a first transistor coupled to the winding so as to apply energization pulses thereto in response to control pulses, means for providing a measurement signal representative of current flow in the winding in response to said energization pulses and means for regulating the control pulses in response to said measurement signal.

Such circuits are currently employed in arrangements comprising a stepping motor driving mechanical elements directly or through a gear train.

Stepping motors are well known and will not be described in detail here, except to recall that they comprise a winding magnetically coupled to a rotor via a stator.

BACKGROUND OF THE INVENTION

The control circuits of stepping motors may take numerous different forms. Their function however is always that of applying energization pulses to the winding, i.e. pulses during which the winding is coupled to an energization source.

These energization pulses may have durations more or less long. Among them, for instance, one may distinguish motor drive pulses which are those normally intended to cause the rotor to step, catch-up pulses having a duration generally greater than that of the drive pulses, and check pulses which are generally of a duration insufficient to cause the rotor to step.

Such energization pulses cause a current to flow in the winding of which the variation as a function of time is well known and will not be described here.

In most cases the control circuit of the motor short-circuits the winding between energization pulses and in particular following each motor drive pulse or catch-up pulse. Because of this short-circuit, a current likewise circulates in the winding immediately following the end of these pulses. This current is induced in the winding by the oscillations which the rotor effects about its equilibrium position at the end of its step. This current is thus likewise produced indirectly by the energization pulse which causes the rotor to step.

The control circuits of stepping motors frequently comprise means for providing a measurement signal representing the current which circulates in the motor winding responsive to these energization pulses. This measurement signal may be employed for instance to adjust the quantity of energy furnished to the motor by its control circuit as a function of the mechanical load driven by the motor. This adjustment enables diminishing the overall energy consumed by the motor, this being important when the motor forms part of a portable arrangement such as an electronic time-piece in which the space available for the energy source is very limited. U.S. Pat. No. 4,114,364 describes a circuit bringing about such adjustment for each motor drive pulse, by measurement of the current which circulates in the winding responsive to the motor drive pulse. In such case, the measurement of the current must be made over the entire duration of the motor drive pulse.

U.S. Pat. No. 4,212,156 describes another circuit realizing this adjustment based on measurement of the current circulating in the winding when the latter is short-circuited, immediately following a motor drive pulse. In this case the current measurement must thus be effected at the end of the motor drive pulse.

The current measurement in the winding may likewise serve to determine if the rotor has stepped correctly responsive to a motor drive pulse. U.S. Pat. No. 4,272,837 describes a control circuit which, following each motor drive pulse, applies to the winding a check pulse having a duration insufficient to step the rotor. The rate of growth of the current in the winding responsive to such check pulse permits the control circuit to determine whether the rotor has correctly stepped or not. In the latter case, the control circuit provides a supplemental pulse, generally referred to as a catch-up pulse, such that the rotor carries out the step which it has just missed. The control circuit likewise adjusts the energy provided to the motor by the following motor drive pulses. In this case, the current measurement must not be made except during the check pulse.

This determination of the rotation or non-rotation of the rotor responsive to a motor drive pulse may likewise be obtained by measuring the current which circulates in the winding responsive to the following motor drive pulse, at an instant situated between the beginning of such motor drive pulse and the beginning of the stepping of the rotor. U.S. Pat. No. 4,300,223 describes a circuit functioning in such manner. In this case, the current measurement must be made only at the instant mentioned hereinabove.

The means for measuring current circulating in the winding generally comprise a resistance coupled in series with the winding. The voltage drop produced by the passage of the current in this resistance constitutes the measurement signal of the current.

Such resistance brings about a lowering of the voltage at the motor terminals and dissipates an energy which is not negligible. To avoid these difficulties, the resistance value must be chosen to be very small but in such case the voltage drop at its terminals is likewise very small thus causing difficulties for its utilization by the measurement circuit.

It has also been proposed to employ the voltage drop at the terminals of one of the power transistors coupled to the winding as a measurement of the current circulating in the latter. The suppression of the measurement resistance effectively comprises an advantage. But the voltage drop at the terminals of the transistor is small, this likewise causing difficulties for its utilization for the control circuit. Moreover, this voltage drop will vary from one transistor to another because of the inevitable differences in their characteristics, this also bringing about difficulties for its utilization.

The known means thus do not permit obtaining measurement of the current circulating in the motor winding in a simple and precise manner.

The purpose of the present invention is to propose a control circuit for a stepping motor comprising a measurement circuit for the current circulating in the winding which avoids the difficulties mentioned hereinabove.

SUMMARY OF THE INVENTION

The invention comprises a control circuit for a stepping motor having a rotor and a winding magnetically coupled to said rotor comprising means which include a first transistor coupled to the winding so as to apply energization pulses thereto in response to control pulses, means for providing a measurement signal representative of current flow in the winding in response to said energization pulses and means for regulating the control pulses in response to said measurement signal, said means for providing a measurement signal comprising a second transistor and means for forming a current mirror with said first and second transistor, the current supplied by said current mirror being representative of current flow in the winding.

DESCRIPTION OF THE PREFERRED EMBODIMENT

Figure 1:
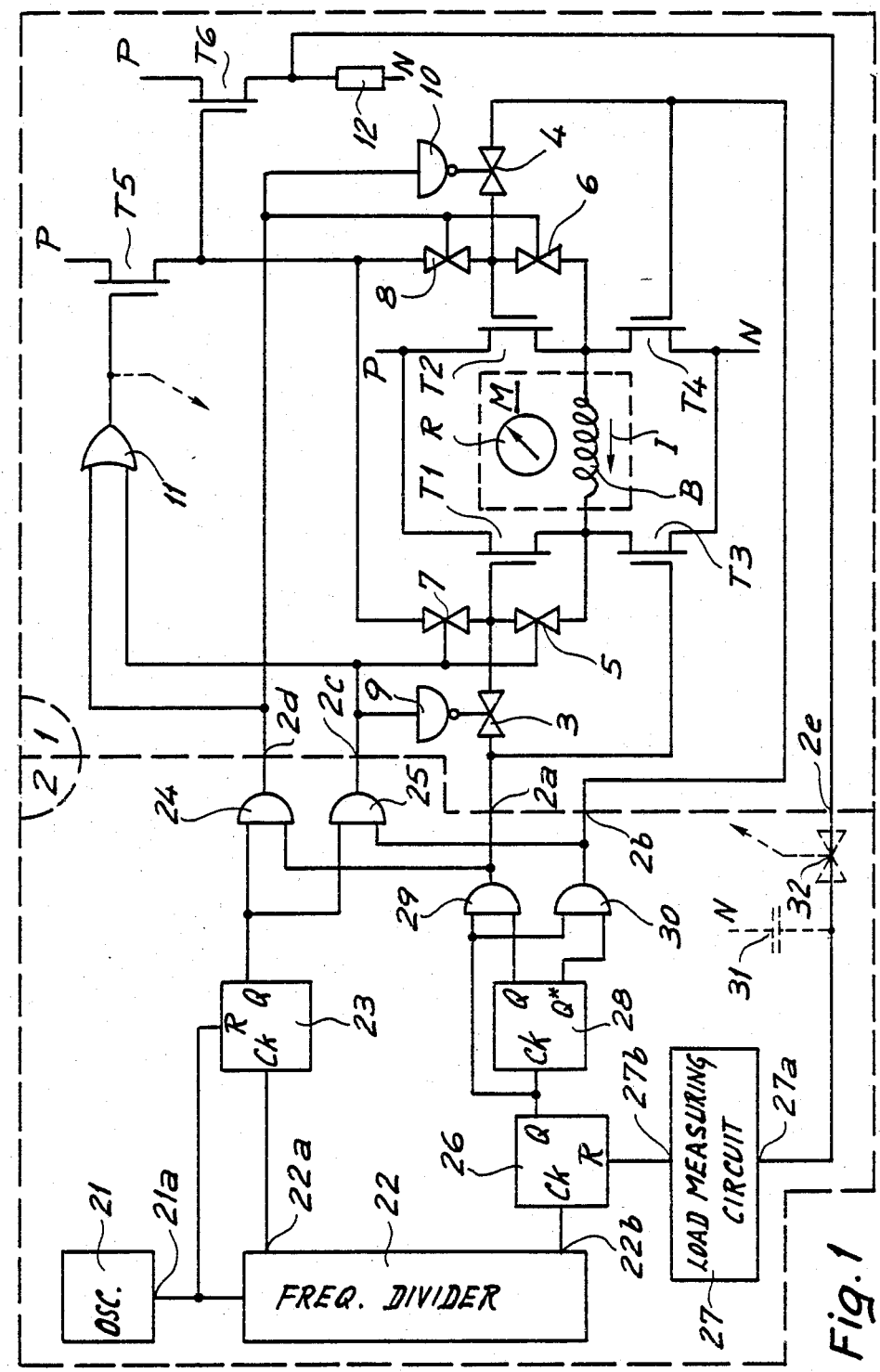
FIG. 1 shows a schematic of a control circuit according to the invention.

FIG. 1 represents by way of a non-limiting example, the schematic of an electronic time-piece comprising a stepping motor M of the type presently employed in time-pieces which drives time displaying hands for hours, minutes and seconds, not shown, via a gear train also not shown.

Motor M which will not be described here in detail comprises a rotor R including a permanent bipolar magnet of which the axis of magnetization is symbolized by an arrow, and a winding B magnetically coupled to the rotor R by a stator which is not shown.

The rotor turns each second in a well-known manner through a step of 180° responsive to a motor drive pulse applied to winding B by a control circuit which comprises a circuit forming energization pulses 1 and a circuit generating control pulses 2.

The circuit forming the energization pulses 1 comprises in a well-known manner a bridge formed by two MOS transistors of the p type, designated T1 and T2, and two MOS transistors of the n type, designated T3 and T4.

The drains of transistors T1 and T3 are coupled together to one of the terminals of winding B and the drains of transistors T2 and T4 are coupled together to the other terminal of winding B.

The sources of transistors T1 and T2 are coupled to the positive terminal P of an electrical energy source not shown, which energizes the entire circuit of FIG. 1. This electrical energy source, in the present example, is a battery.

The sources of transistors T3 and T4 are coupled to the negative terminal N of the battery.

The gates of transistors T3 and T4 are respectively coupled to the outputs 2a and 2b of the control pulse generating circuit 2 which will be described further on.

The gates of transistors T1 and T2 are likewise coupled to the respective outputs 2a, 2b but via two transmission gates, respectively 3 and 4.

The gate and the drain of transistor T1 are coupled together via a transmission gate 5 and the gate and the drain of transistor T2 are coupled together by a transmission gate 6.

Furthermore, the gates of transistors T1 and T2 are both coupled respectively by transmission gates 7 and 8, to the drain of a p type MOS transistor, designated T5, and to the gate of a further p MOS transistor designated T6.

The control electrodes of the transmission gates 5 and 7 are coupled together to another output 2c of the circuit 2. The control electrode of the transmission gate 3 is coupled to this output 2c via an inverter 9.

In the same manner, the control electrodes of the transmission gates 6 and 8 are coupled together at an output 2d of circuit 2 and the control electrode of the transmission gate 4 is coupled to this output 2d by an inverter 10.

The source of transistor T5 is coupled to the positive terminal P of the battery and its gate is coupled to the output of an OR-gate 11.

The two inputs of this gate 11 are coupled to the outputs respectively 2c and 2d of circuit 2.

Finally, the source of transistor T6 is likewise coupled to the positive terminal P of the battery and its drain is coupled to an input 2e of circuit 2 and via a resistance 12 to the negative terminal N of the battery.

The control pulse generating circuit 2 likewise shown on FIG. 1 comprises in this example an oscillator 21 which furnishes a periodic signal having a frequency of 32,768 Hz to its output 21a.

This signal is applied to the input of a frequency divider 22 formed in a well-known manner by a chain of series-connected flip-flops which are not separately shown on FIG. 1. This divider circuit comprises in the present example two outputs 22a and 22b which furnish periodic signals having respectively frequencies of 4,096 Hz and 1 Hz.

The signals furnished by the outputs 21a, 22a and 22b are, in a well-known manner, in the form of square logic pulses, i.e. they assume alternately the logic state "0" and "1" during one half of their period, i.e. during about 15 microseconds, 122 microseconds and 500 milliseconds respectively.

The output 22a of the divider 22 is coupled to the clock input Ck of a T type flip-flop 23 of which the reset input R is coupled to the output 21a of oscillator 21.

The output Q of flip-flop 23 is coupled to the first inputs of two AND-gates 24 and 25, the outputs of which are respectively coupled to the outputs 2d and 2c of the generator circuit 2.

The output 22b of divider 22 is coupled to the clock input Ck of a flip-flop 26 likewise of the T type, of which the reset input R is coupled to the output 27b of a load measuring circuit 27 responsive to the mechanical load driven by the motor M. This circuit 27 of which the input 27a is coupled to the input 2e of generator circuit 2 is for example of the type described by the U.S. Pat. No. 4,114,364. The output Q of flip-flop 26 is coupled to the clock input Ck of a flip-flop 28 likewise of the T type, and to the first inputs of two AND-gates 29 and 30.

The direct output Q and inverse output Q* of flip-flop 28 are respectively coupled to the second inputs of gates 29 and 30.

The outputs of these gates 29 and 30 are respectively coupled to the second inputs of gates 24 and 25 as well as to the outputs 2a and 2b of generator circuit 2.

The operation of the circuits of FIG. 1 will now be described having reference to FIGS. 2 and 3.

Figure 2:
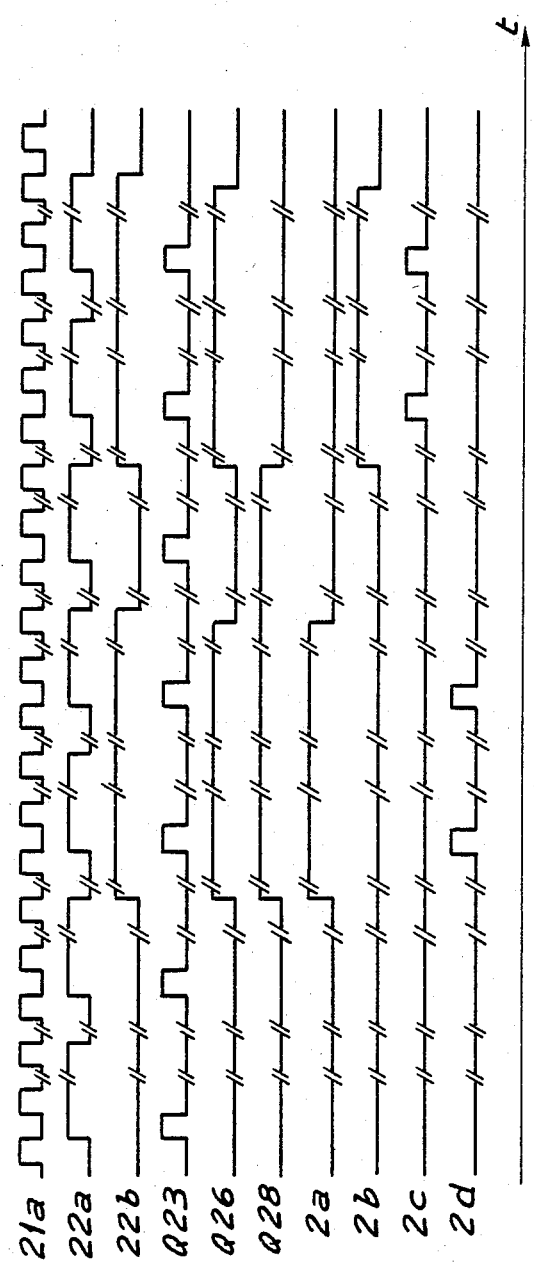
FIGS. 2 and 3 are diagrams representing some of the signals measured in the circuit of FIG. 1.
Figure 3:
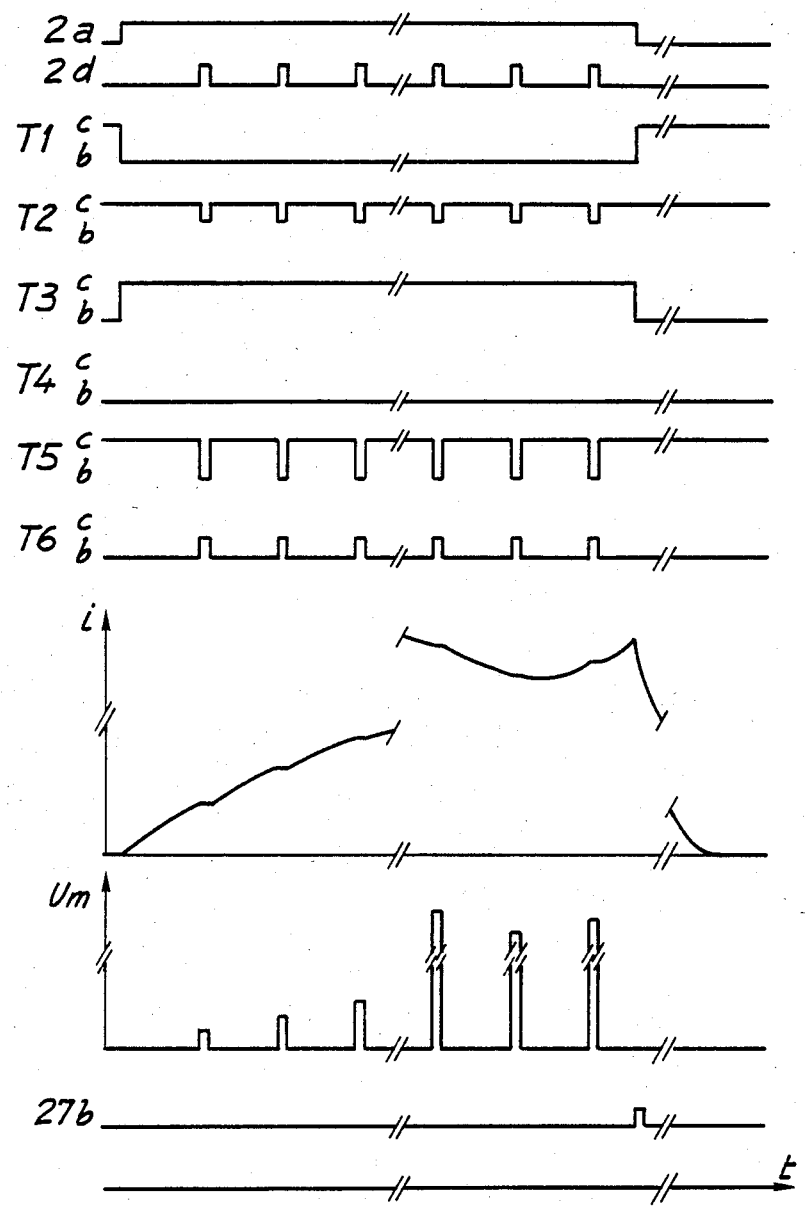

The diagrams of these FIGS. 2 and 3 bear reference numbers corresponding to points of the circuit of FIG. 1 and represent the variation of the logic signals measured at these respective points as a function of time.

In FIG. 3, the graphs designated by T1 to T6 represent the state of the transistors bearing the same reference. These transistors may be blocked, in which case the graph which corresponds thereto is situated in line with reference figure b or they may be conductive in which case the graph is situated in line with reference c. Moreover, as will be explained further on, transistors T1, T2 and T6 may be found in an intermediate state between their blocked and their conductive states in which case the graph corresponding is arbitrarily situated between references b and c.

In FIG. 3 also the graph designated by i represents the current circulating in the winding during a motor drive pulse and the graph designated by Um represents the measurement signal which will be described further on.

It is to be noted that the scales to which FIGS. 2 and 3 are drawn are arbitrary and different from one another.

As is generally the case in divider circuits, the flip-flops which form the frequency divider 22 are arranged and coupled to one another in a manner to change their state responsive to the changing of the output of the flip-flop preceding, or for the first among them, of the output 21a of the oscillator 21, from the logic "1" state to the logic "0" state. There results from this arrangement that the output of any given flip-flop, notably the output 22a or the output 22b of divider 22, changes its logic state at an instant when the outputs of all the preceding flip-flops and the output 21a of the oscillator 21 pass from the logic "1" state to the logic "0" state.

It is likewise to be noted that flip-flops 23, 26 and 28 change their state responsive to the pasage of their clock input Ck from the logic "0" state to the logic "1" state. For flip-flops 23 and 26, that change of state is only possible if their reset input R is at the logic "0" state. If this R input is at the logic "1" state, their output Q is held at the logic "0" state whatever may be the input signal to the clock input Ck.

It is further to be noted that the transmission gates 3 to 8 are arranged so as to be blocked when their control electrode is at the logic "0" state and to be conductive when such control electrode is at the logic "1" state. Finally, as is usually the case, the logic states "0" and "1" are respectively represented in the present example by the potential of the negative terminal N and by the positive terminal P of the energization source of the circuit. There results therefrom that a logic "0" or respectively "1" state applied to the gate of transistors T1, T2, T5 or T6 causes such transistors to be conductive or respectively blocked. On the contrary, a logic "0", respectively "1" state applied to the gate of transistors T3 or T4 renders these latter blocked or respectively conductive.

It is easy to see that the output Q of flip-flop 23 permanently furnishes pulses having a frequency of 4,096 Hz, following the output 22a of divider 22, and a duration of about 15 microseconds, such duration being equal to a half period of the output signal from the oscillator 21.

The output Q of flip-flop 26 furnishes pulses having a frequency of 1 Hz and a duration determined by the circuit 27 as a function of the measurement of current in the winding. This determination will be described further on.

It is also easy to see that the pulses furnished by the output Q of flip-flop 26 are sent to the pulse forming circuit 1 via outputs 2a and 2b alternatively. Moreover, during each pulse provided at the output 2a or 2b the pulses furnished by the output Q of flip-flop 23 go to the pulse forming circuit 1 via the output 2d or, respectively, by the output 2c.

It is to be noted that the first pulse provided by output 2d or 2c begins approximately 122 microseconds following the beginning of the pulse furnished by output 2a or respectively 2b.

Between the pulses furnished by the output Q of flip-flop 26, the outputs 2a, 2b, 2c and 2d of circuit 2 are at the "0" state. The transmission gates 5 to 8 are thus blocked while the transmission gates 3 and 4 are conductive.

The gates of transistors T1 to T4 are thus at the "0" state, which renders conductive transistors T1 and T2 and blocks transistors T3 and T4. The two terminals of winding B are thus coupled to the positive terminal P of the energy source and no current circulates in winding B to the extent that rotor R is immobile.

The output of gate 11 is likewise at the "0" state, thus rendering conductive transistor T5. The gate of transistor T6 is thus coupled to the positive terminal P of the energization source which blocks it. Thus no current flows in resistance 12, and the input 2e of generator 2 will be at the potential of the negative terminal N of the energization source.

Each time that a motor drive pulse must be applied to the motor M, i.e. each second in the present example, the output 22b of the divider 22 goes to the "1" state. If, at this instant, the output Q of flip-flop 26 is at state "0", it changes then to state "1".

The output 2a of generator 2 thus likewise goes to the state "1" so as to block transistor T1 and enable conduction of transistor T3. Since transistor T2 remains conductive, the winding B has applied thereto a voltage almost equal to the voltage of the energization source. A current i thus begins to circulate in winding B in the sense shown by arrow I on FIG. 1.

The pulse forming circuit 1 begins thus to apply a motor drive pulse to motor M responsive to the control signal furnished by the output 2a of generator 2.

About 122 microseconds following the beginning of this motor pulse, the output 2d of generator 2 begins to furnish pulses the generation of which has been described hereinabove.

Each of these pulses, which are referred to as C pulses in the description following, brings about blocking of the transmission gate 4 and conduction of transmission gates 6 and 8. Likewise, each pulse C causes blocking of transistor T5 via gate 11.

For the duration of each pulse C the connection between the gate of transistor T2 and the output 2b of the generator circuit 2 is thus interrupted. On the other hand, the gate and the drain of this transistor T2 are coupled to one another by the transmission gate 6 and to the gate of transistor T6 by the transmission gate 8.

At the end of each pulse C, the transmission gates 6 and 8 are again blocked and the transmission gate 4 becomes once again conductive. The transistor T5 becomes again conductive and transistor T6 again is blocked. The pulse forming circuit 6 is thus once again in the state which it had prior to the beginning of pulse C.

It has been shown hereinabove that during each pulse C, the gate and drain of transistor T2 are coupled together and to the gate of transistor T6. These two transistors T2 and T6 thus form, during pulses C, a circuit which is well known as a current mirror of which the functioning will not be described in detail here.

In such a current mirror, the gate-source voltage of the output transistor which is here transistor T6, is equal to the gate-source voltage of the input transistor which here is transistor T2. The drain current Is of the output transistor is thus proportional to the drain current Ie of the input transistor.

The proportionality factor K between these two currents is given by the relationship:

$$K = Is/Ie = (Ws/Ls) \cdot (Le/We)$$

in which Ws and Ls are respectively the width and the length of the channel of the output transistor and We and Le are respectively the width and the length of the channel of the input transistor.

If the lengths Ls and Le are chosen to be equal, which is generally the case in practice, the factor K depends only from the relationship of the widths Ws and We of the channels of these two transistors.

Modern techniques of manufacture of integrated circuits enable the realization of transistors of which the channels have widths which are in their relationships very precise and easily reproducible. It is thus possible to choose freely the value of the factor K and to manufacture circuits in which the chosen value may be exactly obtained.

In the case of FIG. 1 the current i which circulates in the transistor 2 and in the winding B during any pulse C no longer follows, of course, the well-known variation of winding current responsive to a motor drive pulse since the gate and the drain of this transistor T2 are coupled to one another. This current i decreases exponentially from the value which it had at the beginning of pulse C with a time constant which depends in particular on the value of the inductance L of winding B and the internal resistance of transistor T2.

If this time constant is sufficiently long relative to the duration of pulses C, which is the case in practice, it may be assumed that current i remains essentially constant during each pulse C.

During each pulse C, transistor T6 thus provides a current i' proportional to the current i which circulates at the beginning of this pulse C in transistor T2 and in the winding B.

This current i' could be used as a signal of the measure of current i. However, the circuits intended to employ a measurement signal of this current generally require a voltage signal proportional to such current. It is for this reason that, in the example of FIG. 1, a resistance 12 is connected in series with the current mirror, i.e. between the drain of transistor T6 and the negative terminal N of the energization source.

The passage of the current i' in resistance 12 produces at the point where resistance 12 is coupled to the drain of transistor T6 a measurement voltage the value Um of which is thus likewise proportional to the current i circulating in winding B. The proportionality factor K' between the voltage Um and the current i is, as may readily be seen, given by:

$$K' = K \cdot R12$$

where R12 is the value of the resistance 12.

This voltage Um is applied to the input 27a of the load measuring circuit 27.

This circuit 27 thus receives, during each pulse C, a voltage pulse of which the amplitude is proportional to the intensity of the current i circulating in winding B at the beginning thereof. These voltage pulses which succeed one another during the entire motor drive pulse give thus a faithful image of the current which circulates in the winding of the motor responsive to the motor drive pulse, since the proportionality factor K' between their amplitude Um and this current i is exactly determined.

It is well known that the current variation during a motor pulse depends on the mechanical load driven by the motor. Circuits such as circuit 27 are arranged to determine, as a function of the variation of a voltage proportional to this current i, the optimum instant at which the motor pulse is to be interrupted in order that the electrical energy consumed by the motor is minimum and that nevertheless the rotor is sure to complete its step.

In the present example circuit 27 employs pulses which it receives on its input 27a in order to determine the instant at which the motor drive pulse applied to the winding B may be interrupted. At this instant which does not necessarily coincide with a pulse C, the output 27b of this circuit 27 passes to the "1" state which resets to "0" the output Q of flip-flop 26. The output 2a of generator 2 passes likewise to the "0" state, thereby blocking transistor T3 and causing transistor T1 to conduct. The motor drive pulse is thus interrupted. Moreover, the output 2d ceases to deliver pulses C. The transistor T2 becomes once again permanently conductive as does transistor T5, while transistor T6 is again permanently blocked. The input 27a of circuit 27 is thus again at the potential of the negative terminal N of the energization source. The control circuit of the motor is hence once again in the state which it had before the beginning of the motor pulse, with the exception of flip-flop 28 of which the output Q is now in the "1" state.

One second later, the output 22b of divider 22 passes again to the state "1". Now the output Q* of flip-flop 28 goes to the state "1" and the output 2b begins to deliver a new control pulse. Responsive to this pulse, transistor T2 is blocked and transistor T4 becomes conductive. The pulse forming circuit 1 thus applies to the winding a new motor drive pulse of which the polarity is inverted from the preceding. A current begins to circulate in winding B responsive to such motor drive pulse in the sense opposite to that of arrow I.

In an analogous manner to what has been described hereinabove the output 2c of generator 2 begins to furnish pulses provided by the output Q of flip-flop 23 about 122 microseconds following the beginning of this new motor drive pulse. These pulses are referred to as pulses C'.

During each of these pulses C', transistor T5 is blocked and transistors T1 and T6 form a current mirror circuit which operates exactly as has been described hereinabove.

The input 27a of the circuit 27 for determining the mechanical load driven by the motor thus receives again a series of pulses the amplitude of which is proportional to the current circulating in the winding B at the beginning of such pulses. Hence the output 27b of circuit 27 again goes to the state "1" at an instant which depends on the mechanical load driven by the motor.

The change-over of this output 27b to state "1" brings about the interruption of the motor pulse in course, as has been described hereinabove.

The control circuit described hereinabove in which an auxiliary transistor is periodically connected to one of the transistors which applies motor drive pulses to the winding in order to form with this latter a current mirror circuit presents various advantages relative to known circuits in which the voltage determined by the current which circulates in the winding is obtained by means of a resistance connected in series with this winding.

In particular, a judicious choice of the proportionality factor K mentioned hereinabove and of the value of the measuring resistance 12 of FIG. 1 enables the obtaining of a high measurement voltage which does not necessitate amplification before being applied to a utilization circuit such as circuit 27 of FIG. 1. This is practically not possible in prior known circuits. Moreover, this high measurement voltage is obtained without diminishing the voltage applied to the motor winding during the motor pulses in contrast to what has been employed in known circuits. Finally, the energy dissipated by the measuring circuit formed by the output transistor T6 of the current mirror and the measuring resistance 12 of FIG. 1 may be limited to a fraction of the energy dissipated by the measuring resistance of known circuits.

This invention is not limited to the example described in respect of FIGS. 1 and 2 where the measurement of the current circulating in the winding is made over the entire duration of the motor drive pulse and where this measurement is employed to interrupt such motor drive pulse at an optimum instant.

It is clearly evident that the invention may be applied without difficulty to all cases, of which certain have been indicated hereinabove, wherein a measurement of the current circulating in the winding of a stepping motor must be effected whatever might be the use of such measurement.

It is evidently the case where the motor comprises several windings, in cases where its rotor turns through an angle different from 180° responsive to each motor drive pulse as well as cases where the motor drive pulses forming circuit comprises a number of transistors coupled to the winding other than four.

In all these cases, which will not be described in detail here, the employment of a current mirror such as that which has been described in respect to FIG. 1 brings about the mentioned advantages, that is obtaining a measurement signal of high amplitude very precisely proportional to the current circulating in the winding and diminishing the energy consumed by the measuring circuit.

The man skilled in the art will have no difficulty in adapting the current measuring means described with reference to FIGS. 1 and 2 to any particular circuit which he might wish to employ. Such adaptation would consist essentially in foreseeing in the control circuit means for producing at the desired moment the control pulse or pulses similar to pulses C and C' of the example of FIG. 1.

According to the type of circuit employing the current measurement it is possible that such may not utilize the measurement signal formed by a succession of pulses which has been described hereinabove but that it will require a signal evolving in a manner practically continuous.

Such a signal may be obtained for instance by connecting a capacitor between the input of the circuit employing the current measurement, i.e. the circuit 27 in the example of FIG. 1 and the negative terminal N of the energization source. Such a capacitor has been shown in dotted outline on FIG. 1 with reference 31.

During each measurement control pulse such as one of the pulses C or C' from the examples of FIGS. 1 and 2 this capacitor is charged to the measurement voltage and maintains such voltage at the input of the utilization circuit between these control pulses.

If the value of the measuring resistance (resistance 12 in FIG. 1) is insufficient to assure almost constant voltage at the input of the utilization circuit between the measurement control pulses such as C or C' in spite of the presence of capacitor 31, it is possible to insert a transmission gate between the capacitor 31 and this measuring resistance and to control this transmission gate in a manner such that it conducts only during the measurement control pulses. Thanks to such transmission gate, the capacitor 31 cannot be discharged in the measuring resistance between pulses.

Such a transmission gate has accordingly been shown on FIG. 1 in dotted outline, with reference 32. In the example of FIG. 1 its control electrode is coupled to the output of OR-gate 11 by a connection of which only the extremities have been shown in dotted outline.

This invention is moreover not limited to the case where the current mirror is formed by connecting one or the other of transistors T1 or T2 which are of the p type with a transistor such as T6 which is likewise of the p type. Such current mirror circuit could also be formed with the same advantages by the connection of the one or the other of transistors T3 or T4 which are of the n type, with an auxiliary transistor likewise of the n type.

What we claim is:

1. A control circuit for a stepping motor having a rotor and a winding magnetically coupled to said rotor for causing said rotor to turn by one step in response to a driving pulse, comprising:

driving control pulse providing means for providing a driving control pulse;

driving pulse applying means, including a first transistor connected to said winding and to said driving control pulse providing means, for applying said driving pulse to said winding in response to said driving control pulse;

measurement signal providing means for providing a measurement signal representative of current flowing in said winding, and including a second transistor;

measurement control pulse providing means for supplying a measurement control pulse;

disconnecting means responsive to said measurement control pulse for disconnecting said first transistor from said driving control pulse providing means; and connecting means responsive to said measurement control pulse for connecting said first and second transistors to form a current mirror in which said first transistor constitutes an input transistor of said current mirror and said second transistor constitutes an output transistor of said current mirror, such that current supplied by said second transistor when connected to said first transistor is representative of current flowing in said winding just before the beginning of said measurement control pulse.

2. A control circuit according to claim 1; wherein said first and second transistors are MOS type transistors, the drain of said first transistor is connected to said winding, said disconnecting means is disposed between said driving control pulse providing means and the gate of said first transistor, and said connecting means includes first means responsive to said measurement control pulse for connecting said gate of said first transistor to said drain of said first transistor and second means responsive to said measurement control pulse for connecting said gate of said first transistor to the gate of said second transistor.

3. A control circuit according to claim 1; wherein said measurement signal providing means further includes means for blocking said second transistor in the absence of said measurement control pulse.

4. A control circuit according to claim 1; wherein said measurement signal providing means includes a resistive element in series with said second transistor, with a voltage drop across said resistor being representative of said current supplied by said second transistor, and thereby of said current flowing in said winding.

* * * * *